[19] United States Patent
Brodd

[11] Patent Number: 5,358,801
[45] Date of Patent: Oct. 25, 1994

[54] SOLID ELECTOCHEMICAL CELL OF IMPROVED CAPACITY AND CYCLING CAPABILITY HAVING SURFACTANT IN VANADIUM OXIDE CATHODE MIXTURE

[75] Inventor: Ralph J. Brodd, Morgan Hill, Calif.

[73] Assignee: Valence Technology, Inc., San Jose, Calif.

[21] Appl. No.: 116,783

[22] Filed: Sep. 3, 1993

[51] Int. Cl.⁵ .............................................. H01M 4/02
[52] U.S. Cl. .................................. 429/215; 429/214; 429/218; 429/194
[58] Field of Search ................. 429/214, 215, 218, 194

[56] References Cited

U.S. PATENT DOCUMENTS

| | | |
|---|---|---|
| 3,634,138 | 1/1972 | Voorhies et al. |
| 3,928,067 | 12/1975 | Broadhead et al. |
| 4,440,838 | 4/1984 | Schmidt. |
| 4,654,281 | 3/1987 | Anderman et al. |
| 4,735,875 | 4/1988 | Anderman et al. |
| 4,853,305 | 9/1989 | Anderman et al. |
| 4,964,877 | 10/1990 | Keisth et al. ...................... 29/623.1 |
| 5,041,199 | 8/1991 | DiFranco ...................... 204/181.5 |
| 5,143,805 | 9/1942 | Andermann et al. ............... 424/217 |
| 5,190,695 | 3/1993 | Sotomura ........................... 252/500 |

*Primary Examiner*—Prince Willis, Jr.
*Assistant Examiner*—M. Nuzzolillo
*Attorney, Agent, or Firm*—Gerald F. Swiss

[57] ABSTRACT

Vanadium oxide cathode mixtures which comprise a vanadium oxide cathode material in combination with one or more surface active agents and the incorporation thereof in electrochemical cells as a means for enhancing cumulative capacity and cycling capacity of such cells.

20 Claims, No Drawings

SOLID ELECTOCHEMICAL CELL OF IMPROVED CAPACITY AND CYCLING CAPABILITY HAVING SURFACTANT IN VANADIUM OXIDE CATHODE MIXTURE

BACKGROUND OF THE INVENTION

1. Field of the Invention

This invention is directed to vanadium oxide cathode mixtures comprising a mixture of a vanadium oxide cathode material and an amount of one or more surface active agents. This invention is further directed to electrochemical cells containing as the active cathode material a mixture of at least one vanadium oxide and at least one surface active agent.

This invention is also directed to methods for enhancing the cumulative capacity and cycling capability of electrochemical cells containing vanadium oxides as the active cathode material by employing as the cathode material a mixture containing at least one vanadium oxide and at least one surface active agent.

2. State of the Art

The use of vanadium oxides as the active cathode materials in electrochemical cells, in particular nonaqueous primary and secondary cells, is well known in the art.

For example, the use of $V_2O_5$ as a cathode material in a primary cell is described in Dey et al, U.S. Pat. No. 3,655,585. Moreover, the use of $V_2O_5$ in a secondary cell was first reported by Walk and Gore, Electrochemical Society Meeting, Paper No. 27, Toronto, May 11-16 (1975).

However, secondary cells containing $V_2O_5$ as the active cathode material suffer from various drawbacks, e.g., the low electronic conductivity of $V_2O_5$ and its irreversible reduction at moderate potentials. Additionally, electrolyte oxidation occurs during charging of $V_2O_5$ containing cells.

Accordingly, it is further known to use other vanadium oxides, as an alternative to $V_2O_5$, as the active cathode material in electrochemical cells. For example, Christian et al, U.S. Pat. No. 4,228,226 describe nonaqueous cells comprising lithium metal as the active anode material and vanadium oxides having the normal stoichiometry $VO_{2+y}$, wherein y is greater than or equal to approximately 0.4. Such vanadium oxides include e.g., $VO_2$, $V_3O_7$, $V_4O_9$ and $V_6O_{13}$.

It is also known in the art to use vanadium oxide mixtures which contain other materials, e.g. conductive diluents such as carbonaceous materials, as the active cathode material in electrochemical cells.

For example, Uchiyama et al, U.S. Pat. No. 4,751,197, describes a cathode for use in a lithium electrochemical cell comprising a mix of a mixed metal-oxide prepared from $V_2O_5$ and $MoO_3$, a conductive diluent, and an aqueous based binder wherein the mixture is rolled onto a nickel screen and sintered under vacuum at about 280° C.

Additionally, Hope et al, U.S. Pat. No. 4,576,886, describes a solidstate lithium battery wherein the cathode comprises a layer of polymer spheres, wherein each polymer sphere consists of a vanadium oxide core encapsulated in an ionically and electronically conductive polymeric material. Hope et al indicate that such a composite cathode construction dramatically improves the performance characteristics of lithium anode based solid-state cells.

Related to the Hope et al patent, Rourke et al, U.S. Pat. No. 4,720,410 describes a method for preparing composite cathodes comprising insertion materials including, e.g., vanadium oxides, wherein said insertion compound, in particular vanadium oxide, and an inorganic salt are dispersed in a solution of a polymer contained in a volatile solvent, and then spray dried to remove the solvent and produce cathode spheres comprising the insertion compound as a core material encapsulated in a polymeric matrix containing the inorganic salt.

Additionally, Buchel et al, U.S. Pat. No. 4,952,467, describe a process for producing a composite cathode composition containing a vanadium oxide comprising preparing a powdered mixture of a vanadium oxide (vanadium pentoxide), a carbon, and a mixture of alkaline halides, and then heat processing at a temperature ranging from 360° C. to 650° C. for a time ranging from about 15 minutes to about 2 hours.

It is also known in the art to use surface active agents to improve the performance of electrochemical cells. For example, Voorhles et al, U.S. Pat. No. 3,634,138 teach improving the shelf life and cycle life of secondary cells containing zinc anodes, and an azobisformamide or substituted azobisformamide depolarizer by coating the zinc anode with a small amount of a tetraalkylammonium salt, and by increasing the content of ammonium chloride in the electrolyte mixture.

Additionally, Broadhead et al, U.S. Pat. No. 3,928,067, describes a lithium nonaqueous secondary battery containing dopants which improve the recycling characteristics of said battery by acting as wetting agents for a polypropylene separator contained therein.

Further, Schmidt, U.S. Pat. No. 4,440,838, describes an improved battery separator for lead-acid battery cells which is formed by depositing an improved wetting composition onto a polyolefin substrate comprised of entangled microfibers, wherein the wetting composition comprises an epoxy compound, a wetting agent and an emulsifier.

Also, Anderman et al, U.S. Pat. Nos. 4,654,281, 4,853,305, 4,735,875 and 5,143,805, describe cathode compositions comprising a microporous sheet composed of from 2-30 weight percent polyethylene, 70-98 weight percent of electrically conductive and electrochemically active particulate material, and from 0 to 5.0 weight percent of a plasticizer for the polyethylene. In addition to the above described components, Anderman et al suggest that the admixture may contain conventional stabilizers, antioxidants, wetting agents, processing acids or mixtures thereof, with sodium alkyl benzene sulfonate, sodium lauryl sulfate, dioctyl sodium sulfosuccinate and isooctyl phenyl polyethoxy ethanol being exemplary of known commercially available wetting agents. However, while vanadium oxides are among the numerous identified cathode materials named by Anderman et al, these patents fail to describe any specific cathode mixtures comprising a vanadium oxide in combination with a surface active agent.

Notwithstanding the above, the capacity (cathode utilization) and cycle life of electrochemical cells, in particular solid batteries, containing vanadium oxides as the active cathode material is often less than desirable. Moreover, even when the initial capacity of the solid batteries is relatively high, the solid batteries often exhibit rapid decline in capacity over their cycle life.

Specifically, the cumulative capacity of an electrochemical cell, e.g., a solid battery, is the summation of the capacity of the solid battery over each cycle (charge and discharge) in a specified cycle life. Solid batteries having a high initial capacity but which rapidly lose capacity over the cycle life will have low cumulative capacity which interferes with the effectiveness of these batteries for prolonged usage.

In view of the above, the art is searching for methods to improve the capacity and cycle life of electrochemical cells, in particular solid batteries, which contain vanadium oxides as the active cathode material. It goes without saying that increases in capacity and cycle life of electrochemical cells comprising vanadium oxides as the active cathode material would enhance their widespread commercial usage.

SUMMARY OF THE INVENTION

The present invention in its broadest embodiment is directed to improved cathode mixtures which comprise at least one vanadium oxide and an amount of at least one surface active agent which is sufficient to improve the wetting characteristics of the vanadium oxide in an aprotic electrolytic solvent. The specific weight percentage of the surface active agents contained in the inventive cathode mixtures will range from about 0.1 to 1%. The surfactants of the present invention are distinguished from the organic solvents used in certain cathode mixtures in that surfactants are used in small amounts to improve the wetability of vanadium oxide, while solvents are selected and used to improve the plastic and electrolytic properties of the cathode mixture. These surfactants are also distinguished by having moderate molecular weights in the range of from 200 to 1000, preferably from about 300 to about 600 M.W.

Conventional vanadium oxide containing cathode mixtures do not include surface active agents. However, vanadium oxides do not exhibit good wetting characteristics. Moreover, many conventional vanadium oxide containing cathode mixtures contain carbonaceous materials, which also exhibit poor wetting characteristics.

Therefore, the addition of a surface active agent to such vanadium oxide containing cathode mixtures should substantially enhance the wetting characteristics and the handling properties of such cathode mixtures.

Specifically, the surface active agents will dissolve into the cathode mixture and wet the vanadium oxide and optionally carbonaceous materials and other oxides which may be contained therein. The addition of a surface active agent should further enhance the efficiency of mixing of the cathode materials thereby resulting in a more uniform cathode mixture in a shorter mixing time.

Moreover, the presence of a surface active agent in the cathode mixture should enhance the efficiency of discharge of the cathode. In particular, the surface active agent should enhance the surface area of the vanadium oxide and other oxides and carbonaceous materials which are contained in the cathode mixture which are in contact with the electrolyte. This increase in surface area contact should enhance the penetration of the electrolyte into the pores of the vanadium oxides and other oxides and carbonaceous materials and thereby enhance cathode utilization.

It is further expected that the incorporation of the subject cathode mixtures which contain vanadium oxides and surface active agents will improve the cycling life of electrochemical cells which comprise lithium as an active anode material. In particular, the presence of one or more surface active agents in the cathode formulation should improve the uniformity of the re-deposition of lithium during charging of lithium anode containing electrochemical cells. Essentially, the surface active agents will be adsorbed onto the surface of the lithium anode and thereby alter the surface states of the deposited lithium adatoms. This affects the nucleation and growth process which occurs during deposition of lithium during the charging process.

The resultant altered surface state should induce the lithium to form a large number of small nuclei of lithium metal across the lithium surface. Accordingly, the presence of the surface active agent should result in the formation of a more uniform layer of lithium ad-atoms being deposited during charging of the battery.

In contrast, if only a few nuclei are allowed to form, there is the tendency for the lithium ad-atoms to build upon a limited number of existing nuclei and for growth to occur only on said limited number of nuclei. This localized deposition results in dendrites and mossy deposits which adversely affect the cycle life expectancy of lithium containing batteries.

Therefore, by avoiding or reducing the formation of dendrites or mossy deposits, the subject cathode mixture should enhance the cycle life expectancy for lithium batteries.

Accordingly, in one of its composition aspects the invention is directed to a cathode mixture which comprises:

at least one vanadium oxide; in combination with an amount of at least one surface active agent sufficient to improve the wetting properties thereof in an aprotic electrolytic solvent.

The vanadium oxides suitable for use on the subject cathode mixtures will comprise any known vanadium oxide which is suitable for use as an active cathode material. For example, suitable vanadium oxides will include $VO_2$, $V_2O_5$, $V_3O_7$, $V_3O_8$, $V_4O_9$, and $V_6O_{13}$.

The surface active agents for use in the subject cathode mixtures is a surface active agent which improves the wetting characteristics of a vanadium oxide in aprotic electrolytic solvents. Such materials are nonionic, anionic, cationic or surface active agent having molecular weights between 200 and 1000, preferably between 300 and 600 M.W. Surface active agents are well known in the art and are commercially available, as disclosed by M. Ash and I. Ash in the "Encyclopedia of Surfactants," 2 vols., McGraw-Hill, 1980, the disclosure of which is incorporated herein by reference in its entirety.

Specific examples of anionic surface active agents include the ammonium and alkali metal salts of hydrocarbyl sulfates or sulfonates (e.g. alkylated aromatic sulfates and sulfonates) are "anionic" because their activity resides in the anionic portion of the molecule (e.g. $RCH_2OSO_3^-$ $Na^+$ where R is an alkyl, alkaryl or aryl moiety, such as sodium cetyl sulfate). The hydrophobic groups attached to the sulfate or sulfonate are usually aliphatic or aromatic groups which may contain minor amounts of substituents such as ester, amino, halide, hydroxyl, and ether groups. Particularly preferred are ammonium and alkyl metal salts of perfluorocarbyl sulfates and sulfonates.

Examples of nonionic surface active agents include the alkaryl ethers and alcohols of poly(alkylene glycol), and the alkaryl esters of poly(alkylene glycol) and the like. The nonionic nature of these wetting agents is evident.

Examples of cationic surface active agents contemplated for use in the invention include the quaternary ammonium salts, such long chain hydrocarbyl groups attached to nitrogen as in cetyltrimethylammonium chloride or cetylpyridinium chloride. In cationic surfactants the activity resides in the cationic portion of the molecule.

In another of its composition aspects, the present invention is directed to an electrochemical cell which comprises:

an anode comprising a compatible anodic material;

a cathode comprising at least one vanadium oxide and an amount of one or more surface active agents sufficient to improve the wetting characteristics thereof in an aprotic electrolytic solvent; and an aprotic electrolyte composition interposed therebetween.

In a preferred embodiment the compatible anodic material will comprise lithium. However, the invention is not restricted to lithium anode materials but rather generically embraces any anode material compatible for use with the subject vanadium oxide cathode mixtures.

The electrolyte composition will include solid and liquid electrolyte compositions which are compatible for use with vanadium oxide cathode materials. However, in the preferred embodiment the electrolyte composition will generally comprise a single-phase, solid solvent containing electrolyte which comprises:

a solid polymeric material;

an inorganic ion salt; and one or more organic aprotic electrolytic solvents.

Especially preferred examples of solid, single-phase solvent-containing electrolytes are described in Ser. No. 07/918,503 filed on Jul. 22, 1992, and Ser. No. 07/918,508 filed on Jul. 22, 1992, which are hereby incorporated by reference in their entirety.

DETAILED DESCRIPTION OF THE PREFERRED EMBODIMENTS

As noted above, this invention is directed to cathode mixtures containing at least one vanadium oxide and an amount of at least one surface active agent sufficient to improve the wetting properties of said vanadium oxide in an aprotic electrolytic solvent. These vanadium oxide cathode mixtures, by virtue of the presence of a surface active agent, provide for enhanced cathode utilization (capacity) and cycle life when used in electrochemical cells, in particular solid batteries.

However, prior to describing this invention in further detail, the following terms will first be defined.

Definitions

As used herein, the following terms have the following meanings. The term "surface active agent" or "surfactant" refers to a material which concentrates at the surface of a liquid in which it is dissolved, or at the interface of a liquid and another immiscible liquid or solid and which reduces surface tension when dissolved in water or water solutions, or which reduces interfacial tension between two liquids, or between a liquid and a solid. In the present disclosure the phrase "wetting agent" and "surface active agent" will be used interchangeably.

In general, the structure of a surface active agent can be represented as a hydrophobic tail attached to a functional or solubilization group. These materials include anionic, cationic and nonionic compounds.

Surface active agents are widely known in the art and are commercially available. Three useful classes of surface active agents are (1) fluorinated materials, (2) silicones and (3) hydrocarbon materials. In regard to their relative ability to reduce surface tension in aprotic systems, the general trend is that fluorochemicals are more effective than silicones, which are in turn more effective then hydrocarbons. However, the present invention is not restricted to any specific class of surface active agent, but rather embraces the use of any surface active agent which enhances the surface contact and penetration of an aprotic electrolyte into a vanadium oxide cathode mixture and thereby enhances the wetting properties of said cathode mixture.

The term "aprotic" refers to solvents that lack hydrogen attached to oxygen or nitrogen. Water, the lower alcohols and acids (e.g. acetic acid) are protic solvents. Acetone, acetonitrile, nitrobenzene, sulfolane, hexane and carbon tetrachloride are aprotic solvents.

In the practice of the present invention the electrolytic solvents are aprotic solvents, and it is preferred that the surfactant be a substantially aprotic solvent. Herein "substantially aprotic" signifies that hydrogen attached to oxygen and nitrogen makes up less than about 0.5 weight percent of the surfactant molecule.

The particular selection of surfactant will depend on factors including relative performance of the particular material, and its cost-effectiveness. The surface active agents contemplated for use in the present invention include e.g., commercially available fluorochemical materials such as the alkali metal and ammonium salts of perflorocarbyl sulfates and sulfonates, for example: $R_1SO_3NH_4^+(n\sim10)$ (Tradename Fluorad FC-120), $R_fSO_2N(C_2H_5)CH_2CO_2^-K^+$ ($n\sim8$), (Tradename Fluorad FC-129), $R_fSO_2NHC_3H_6N^+(CH_3)_3I^-(n\sim8)$, (Tradename Fluorad FC-135), $R_fSO_2N(C_2H_5)(CH_2CH_2O)_xH$ ($n\sim8$) (Tradename Fluorad FC-170C), $R_fSO_2N(C_2H_5)(CH_2CH_2O)_xCH_3(n\sim8)$ (Tradename Fluorad FC- 171) (wherein $R_f$ is $C_nF_{2n+1}$) fluoroaliphatic polymeric esters available under trade names Fluorad FC-430, Fluorad FC-431 and Fluorad FC-740, ammonium perfluoroalkyl sulfonates such as Fluorad FC-93, and perfluoroalkyl sulfonates such as Fluorad FC-99 amine. All the aforementioned have molecular weights in the range of from 200 to 1000, and are surfactants for vanadium oxides in aprotic electrolytic solvents.

Other suitable surface active agents will include hydrocarbon surfactants such as sorbitan monooleates (available from ICI Americas Inc. under the Tradename SPAN 80), octylphenoxypolyethoxyethanol nonionic surfactant (available from Union Carbide under the Tradename TRITON-X-100CG), and alkyloxypolyethyleneoxypolypropyleneoxy ethanol (available from Union Carbide under Tradename TRITON XL-8ON). All the aforementioned surfactants have molecular weights, 200–1000, and are surfactants for vanadium oxides in aprotic electrolytic solvents.

However, the above surfactant materials are only intended to be exemplary and in no way exhaustive. All surfactants finding use in the present invention have molecular weights from 200 to 1000, preferably from about 300 to about 600, and are used in amounts less than 1 weight percent based on the total weight of the cathode mixture.

In the envisioned preferred embodiments, the particular surface active agents utilized will comprise TRITON XL-8ON, TRITON X-100CG (both available from Union Carbide) Fluorad FC-171 and Fluorad FC-431 (both available from 3M Company) and SPAN 80 (available from ICI Americas Inc.)

"Vanadium oxide" will refer to any material containing vanadium and oxygen which comprises utility as a cathode material. Such materials include by way of example $VO_2$, $V_2O_5$, $V_3O_7$, $V_3O_8$, $V_4O_9$, and $V_6O_{13}$.

The term "cathode mixture" refers to a composition which contains at least one vanadium oxide which functions as a positive pole in an electrolytic cell and an amount of at least one surface active agent sufficient to improve the wetting characteristics thereof when the cathode mixture is used in a electrolytic cell.

This cathode mixture may further comprise other compatible cathodic materials including electroconductive materials such as graphite, powdered carbon, powdered nickel, metal particles, conductive polymers, other metal oxides, and the like, binder materials such a poly(tetrafluoroethylene), and organic aprotic electrolyte solvents such as organic carbonates, glymes, and cyclic ethers.

In one embodiment, the vanadium oxide cathode material is mixed with an electroconductive material such as, by way of example, graphite, powdered carbon, powdered nickel, metal particles, conductive polymers (i.e., characterized by a conjugated network of double bonds like polypyrol and polyacetylene), and the like, and a binder such as poly(tetrafluoroethylene) to form under pressure a positive cathodic plate.

In a preferred embodiment, the cathode is prepared from a cathode mix which comprises from 35 to 65 weight percent of a vanadium oxide cathode material, from about 1 to 20 weight percent of polyethylene oxide having a number average molecular weight of at least 100,000; from about 10 to 50 weight percent of an aprotic organic electrolyte solvent, from at least about 5 weight percent to about 30 weight percent of a solid matrix forming monomer or partial polymer thereof, and from about 0.1 to 1.0 weight percent of one or more surface active agents. (All weight percents are based on the total weight of the cathode.)

The cathode mix is typically spread onto a suitable support such as by conventional methods to provide for a solid positive cathodic plate. The cathode (excluding the support) generally has a thickness of from 2.0 to about 150 microns. Current collectors are well known in the art and are commercially available. A particularly preferred current collector comprises a roughened nickel (electrolytically deposited nickel) on nickel current collector (available as CF 18/NiT) from Fukuda Metal Foil and Powder Company, Ltd., Kyoto, Japan). The current collectors are preferably attached to the surface of the cathode not facing the electrolyte but can also be attached to the anode. When the current collector is attached to the cathode, the cathode is interposed between the electrolyte and the current collector.

In a preferred embodiment, the electrolyte solvent and the cathode solvent are identical.

The term "anode" refers to any anodic material which functions as a negative pole in an electrolytic cell and which is compatible with the vanadium oxide cathode mixture. Such compatible anodic materials are well known in the art and include, by way of example, lithium, lithium alloys such as alloys of lithium with aluminum, mercury, nickel, zinc, and the like, and intercalation based anodes such as carbon, $WO_3$, and the like.

The term "electrolyte" refers to any compatible liquid or solid electrolyte. Known liquid electrolytes include by way of example organic aprotic solvents, e.g., carbonates such as propylene carbonate, ethylene carbonate, glymes such as dimethoxyethane, diglyme, tetraglyme, dimethylsulfoxide, dioxolane, and sulfolane.

Solid electrolytes comprise an inorganic or organic matrix in combination with a suitable inorganic ion salt. Such inorganic matrices may be non-polymeric [e.g., $\beta$-alumina, silver oxide, lithium iodide, etc.] or polymeric [e.g., inorganic (polyphosphazine) polymers] whereas the organic matrices are typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, polyethylene oxide, polypropylene oxide, polyethyleneimine, polyepichlorohydrin, polyethylene succinate, and an acrylol-activated polyoxyalkylene oxide containing an acrylol group of the formula $CH_2=CR^1C(O)O$—wherein $R^1$ is hydrogen or a lower alkyl of from 1–6 carbon atoms.

As discussed supra, in a preferred embodiment, the electrolyte will comprise a solid, single-phase, solvent-containing electrolyte which comprises:
a solid polymeric matrix;
an inorganic non salt; and
one or more aprotic organic solvents.

Especially preferred solid, single-phase, solvent-containing electrolytes are described in commonly assigned application Ser. No. 07/918,503, filed on Jul. 22, 1992, and 07/918,508 filed on Jul. 22, 1992, which applications are incorporated by reference in their entirety.

The term "solid polymeric matrix" refers to an electrolyte compatible material formed by polymerizing an inorganic or organic monomer (or partial polymer thereof) which, when used in combination with the other components of the electrolyte renders the electrolyte solid. Such solid matrices may or may not be ionically conductive. However, ionically conductive solid materials capable of ionically conducting in organic cations (e.g., alkali ions) are generally preferred.

Suitable solid polymeric matrices are well known in the art and include solid matrices formed from inorganic polymers, organic polymers or a mixture of organic polymers with inorganic non-polymeric materials.

Preferably, the solid polymeric matrix is an organic matrix derived from a solid matrix forming monomer and from partial polymers of a solid matrix forming monomer.

The term "a solid matrix forming monomer" refers to inorganic or organic materials which in monomeric form can be polymerized, preferably in the presence of an inorganic ion salt and an organic solvent or mixture thereof, to form solid matrices which are suitable for use as solid electrolytes in electrochemical cells. Suitable solid matrix forming monomers are well known in the art and the particular monomer employed is not critical. Preferably, the solid matrix forming monomers have at least one hetero atom capable of forming donor acceptor bonds with inorganic cations (e.g., alkali ions). When polymerized, these compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), which is incorporated herein by reference in its entirety.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, /β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

Examples of suitable inorganic solid matrix forming monomers include, by way of example, phosphazines and siloxanes. Phosphazine monomers and the resulting polyphosphazine solid matrix are disclosed by Abraham et at.. *Proc. Int, Power Sources Syrup.*, 34th, pp. 81–83 (1990) and by Abraham et al., *J. Electrochemical Society*, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of an inorganic ion salt and an aprotic solvent or mixture of different solvents, in particular organic carbonates and/or glyme compounds, to form solid polymeric matrices which are suitable for use as solid electrolytes in electrochemical cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc.

The solid matrix forming monomer or partial polymer can be cured or further cured prior to or after addition of the inorganic ion salt and the solvent, e.g., an organic carbonate, or a glyme, or a mixture thereof. For example, a composition comprising requisite amounts of the solid matrix forming monomer, inorganic ion salt and organic solvent (e.g., carbonate and/or glyme) can be applied to a substrate and then cured. Alternatively, the solid matrix forming monomer can be first cured and then dissolved into a suitable volatile solvent. Requisite amounts of the inorganic ion salt and organic carbonate/glyme solvent can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures brow room temperature. Accordingly, the solid electrolyte does not include a separator as is typical of liquid electrolytes.

The term "inorganic ion salt" refers to any inorganic salt which is suitable for use in a solid electrolyte. The particular inorganic ion salt employed is not critical and examples of suitable inorganic ion salts include, by way of example, $LiClO_4$, $LiI$, $LiSCN$, $LiBF_4$, $LiAsF_6$, $LiCF_3(SO_3)_2$, $LiPF_6$, $NaI$, $NASCN$, $KI$, $CsSCN$, $AgNO_3$ $CuCl_2$ $Mg(ClO_4)_2$ and the like. The inorganic ion salt preferably contains at least one atom selected from the group consisting of Li, Na, K, Cs, Ag, Cu and Mg.

The term "electrolytic organic solvent" is an organic solvent (plasticizer) which is added to the solid polymeric matrix in order to enhance the solubility of the inorganic ion salt in the solid electrolyte and thereby increase the conductivity of the cell. The same electrolytic solvent (or a different electrolytic solvent) is added to the cathode mixture to provide plasticity and solubility for the inorganic ion salt. Examples of such solvents include organic carbonates such as propylene carbonate, ethylene carbonate, and other aprotic solvents such as tetrahydrofuran, glymes such as diglyme, triglyme, etc., dimethylsulfoxide, dioxolane, sulfolane and the like.

The term "organic carbonate" refers to hydrocarbyl carbonate compounds of no more than about 12 carbon atoms and which do not contain any hydroxyl groups. Preferably, the organic carbonate is an alicyclic or an aliphatic carbonate.

Suitable alicyclic carbonates for use in this invention include 1,3-dioxolan-2-one (ethylene carbonate); 4-methyl- 1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; spiro(1,3-oxa-2-cyclohexanone-5',5',1',1-oxa-21-cyclohexanone); and 1,3-dioxolen-2-one.

Several of these alicyclic carbonates are commercially available such as propylene carbonate and ethylene carbonate. Alternatively, the alicyclic carbonates can be readily prepared by well known reactions. For example, reaction of phosgene with a suitable alkane-α,β-diol (dihydroxy alkanes having hydroxyl substituents on adjacent carbon atoms) or an alkan-α,γ-diol (dihydroxy alkanes having hydroxyl substituents on carbon atoms in a 1,3 relationship) yields an alicyclic carbonate for use within the scope of this invention. See, for instance, U.S. Pat. No. 4,115,206, which is incorporated herein by reference in its entirety.

Likewise, the alicyclic carbonates useful for this invention may be prepared by transesterification of a suitable alkane-α,β-diol or an alkanα,β-dioi with, e.g., diethyl carbonate under transesterification conditions. See, for instance, U.S. Pat. Nos. 4,384,115 and 4,423,205 which are incorporated herein by reference in their entirety.

Additional suitable alicyclic carbonates are disclosed in U.S. Pat. No. 4,747,850 which is also incorporated herein by reference in its entirety.

The term "electrochemical cell" refers to a composite for storing electrical energy containing an anode, a cathode and an ion-conducting electrolyte interposed therebetween.

Methodology

Methods for preparing vanadium oxide containing cathodes are well known in the art. This invention, however, includes in the cathode composition an amount of at least one surface active agent sufficient to improve the wetting characteristics of the vanadium oxide to aprotic electrolytic solvents contained therein.

Preferably the surface active agents will be added to the cathode mixture during preparation of the cathode mixture. The amount of surface active agent added will preferably range from about 0.1 to 1.0 percent by weight of the cathode mixture.

In an embodiment, the vanadium oxide cathode material will be mixed with an electronegative material including by way of example, graphite, powdered carbon, powdered nickel, metal particles, conductive polymers (i.e., characterized by a conjugated network of double bonds like polypyrol and polyacetylene), and the like, a binder such as poly(tetrafluoroethylene) and from 0.1 to 1.0% by weight of one or more surface active agents.

In a preferred embodiment, the cathode will be prepared from a cathode paste which comprises from about 35 to 65 weight percent of a vanadium oxide cathode material, from about 0.1 to about 1.0 weight percent of one or more surface active agents, from about 1 to 20 weight percent of an electroconductive agent; from about 0-20 weight percent of polyethylene oxide having a number average molecular weight of at least 100,000; from about 10 to 50 weight percent of an aprotic organic electrolyte solvent such as an organic carbonate and/or a glyme; and from at least about 5 weight percent to about 30 weight percent of a solid matrix forming monomer or partial polymer thereof. (All weight percents are based on the total weight of the cathode.)

Suitable surface active agents are identified supra. In the preferred embodiments the surface active agents will comprise TRITON X-100CG, TRITON XL-80, Fluorad FC171, Fluorad FC-431 and SPAN 80, or mixtures thereof.

This cathode paste will preferably be spread onto a suitable support such as a current collector and then cured by conventional methods to provide for a solid positive cathodic plate. The cathode (excluding the support) will preferably have a thickness of from about 20 to about 150 microns.

Current collectors are well known in the art, some of which are commercially available. A preferred current collector is a carbon-coated aluminum foil. As discussed supra, a particularly preferred current collector comprises a roughened nickel (electrolytically deposited nickel) on nickel current collector (available as (CF18/NiT from Fukuda Metal Foil and Powder Company, Ltd. Kyoto, Japan). The current collectors will preferably be attached to the surface of the cathode not facing the electrolyte but can also be attached to the anode. When the current collector is attached to the cathode, the cathode is interposed between the electrolyte and the current collector.

As discussed above, in the preferred embodiment the electrolyte will comprise a solid, solvent-containing electrolyte. Materials for preparing solid, solvent-containing electrolytes are well known in the art.

Utility

The vanadium oxide cathode mixtures described herein which contain one or more surface active agents should be useful in preparing electrochemical cells having improved cumulative capacity and cycle life in comparison to electrochemical cells containing conventional vanadium oxide cathode formulations. Moreover, the subject vanadium oxide cathode mixtures should be particularly useful in preparing solid electrolyte cells having improved cumulative capacity and cycle life in comparison to solid electrolyte cells comprising conventional vanadium oxide cathode compositions. Additionally, the use of the subject vanadium oxide cathode mixtures in electrochemical cells comprising lithium anodes should result in more uniform re-deposition of the lithium during charging and reduce the tendency of the lithium to form dendrites and mossy deposits thereby enhancing the cycle life of cells containing lithium anodes.

The following examples are offered to illustrate the present invention and should not be construed in any way as limiting its scope.

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

- 84.4 weight percent of carbon powder (Shawinigan Black TM—available from Chevron Chemical Company, San Ramon, Calif.)
- 337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)
- 578.0 weight percent of isopropanol The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to pro-vide for a substantially uniform coating. Evaporation of the solvents (i.e., water and isopropanol) via a conventional gas-fired oven provides for an electrically-conducting adhesion-promoter layer of about 6 microns in thicloess or about $3 \times 10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black ™ —available from Chevron Chemical Company, San Ramon, CA) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gearmotor mixer (e.g., Lightin Labmaster Mixer, model XJ-43, available from Cole-Parmer Instruments Co., Niles, Illinois) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275,300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu$m with the occasional 12.5/$\mu$m particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 $\mu$m cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3$) at 450° C. for 16 hours under $N_2$ flow] and 9.56 weight percent of carbon (from Chevron Chemical Company, San Ramon, Calif. under the tradename of Shawinigan Black ™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.). Surfactant is added as 7.5 grams of fluoroaliphatic polymeric ester (Fluorad 430 available from 3M Company).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black ™). The resulting mixture is mixed at a rate of 7.5 cycles per second for 30 minutes in the double planetary mixer. Dunng this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 33.5 weight percent |
| polyethylene oxide | 1 weight percent |
| polyethylene glycol diacrylate | 8.5 weight percent |
| ethoxylated trimethylolpropane triacrylate | 1.5 weight percent |
| fluorad FC-430 | 0.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. Pat. application Ser. No. 07/968,203 filed Oct. 29, 1992 as Attorney Docket No. 1116 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns ($\mu$m) with a conventional plate and roller system and is cured by continuously passing the sheet through an electron beam apparatus (Electro-curtain, Energy Science Inc., Woburn, Mass.) at a voltage of about 175 Kv and a current of about 1.0 Ma and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photoruer 6140, available from Henkel Corp., Coating and Chemical Division, Ambler, Pa.) are combined at room temperature until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a]weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 $\mu$m at 100% efficiency.

Alternatively, the electrolyte solution can be prepared in the following manner. Specifically, in this example, the mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif.) and then proceed to step 4.

2. Dry the propylene carbonate and triglyme over sodiated 4A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif.. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C.

8. After the final addition of the $LiPF_6$ salt, stir for an additional 30 minutes, degas, and let sit overnight and cool.

9. Filter the solution through a sintered stainless steel screen having a pore size between 1 and 50 $\mu m$ at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 $\mu m$ onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 Kv and a current of about 1.0 Ma and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 $\mu m$ thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

What is claimed is:

1. A cathode mixture for a solid electrochemical cell which comprises: at least one vanadium oxide cathode material, and a minor amount of a surface active agent to improve the wetting characteristics of the vanidum oxide cathode material in an aprotic 2. A cathode mixture for a solid electrochemical cell which comprise: at least one vanadium oxide cathode material, and a minor amount of a surface active agent to improve the wetting characteristics of the vanadium oxide cathode material in an aprotic electrolyte solvent, wherein said surface active agent is selected from the group consisting of: $R_fSO_3NH_4$, $R_fSO_2N(C_2H_5)CH_2CO_2K$, $R_fSO_2NHC_3H_6N(CH_3)_3I$, $R_fSO_2N(C_2H_5)CH_2CH_2O)_xH$, $R_fSO_2N(C_2H_5)(CH_2CH_2O)_xCH_3$, fluoroaliphatic polymeric ester, ammonium perfluoroalkyl sulfonate, perfluoroalkyl sulfonate amine, and mixtures thereof, wherein $R_f$ is $C_nF_{2n+1}$, and n is about 8, octylphenoxypolyethoxyethanol, sorbitan monooleates, and alkyloxypolyethyleneoxypolypropyleneoxy ethanol.

3. The cathode mixture of either claim 1 or 2 wherein the vandium oxide is selected from the group consisting of $VO_2$, $V_2O_5$, $V_3O_7$, $V_3O_8$, $V_4O_9$ and $V_6O_{13}$.

4. The cathode mixture of either claim 11 or 2 wherein the vanadium oxide $V_6O_{13}$.

5. A solid electrochemical cell which comprises:
an anode containing a compatible anodic material;
a cathode mixture containing at least one vanadium oxide cathode material is an amount of at least one surface active agent of molecular weight of from 200 to 1000 sufficient to improve the wetting characteristics of said vanadium oxide in an aprotic electrolyte solvent; and
a solid electrolyte interposed therebetween,
wherein said surface active agent is selected from the group consisting of an ammonium or alkali metal salt of a perfluorocarbyl sulfate or sulfonate, octylphenoxypolyethoxyethanol, sorbitan monooleates, and alkyloxypolyethyleneoxypolypropyleneoxy ethanol.

6. A solid electrochemical cell which comprises:
an anode containing a compatible anodic material;
a cathode mixture containing at least one vanadium oxide cathode material in an amount of at least one surface active agent of molecular weight of from 200 to 1000 sufficient to improve the wetting characteristics of said vanadium oxide in an aprotic electrolyte solvent; and
a solid electrolyte interposed there between,
wherein said surface active agent is selected from the group consisting of $R_fSO_3NH_4$, $R_fSO_2N(C_2H_5)CH_2CO_2K$, $R_fSO_2NHC_3H_6N(CH_3)_3I$, $R_fSO_2N(C_2H_5)CH_2CH_2O)_xH$, $R_fSO_2N(C_2H_5)(CH_2CH_2O)_xCH_3$, fluoroaliphatic polymeric ester, ammonium perfluoroalkyl sulfonate, perfluoroalkyl sulfonate amine, and mixtures thereof, wherein $R_f$ is $C_nF_{2n+1}$, and n is about 8, octylphenoxypolyethoxyethanol, sorbitan monooleates, and alkyloxypolyethyleneoxypolypropyleneoxy ethanol.

7. The electrochemical cell of either claim 5 or 6 wherein the cathode mixture further comprises compatible cathodic materials selected from the group consisting of electroconductive materials, binders, organic solvents, organic polymers, inorganic polymers, and mixtures thereof.

8. The electrochemical cell of either claim 5 or 6 wherein the anode material comprises lithium or a lithium containing compound.

9. The electrochemical cell of claim 8 wherein the vanadium oxide is $V_6O_{13}$.

10. The electrochemical cell of either claim 5 or 6 wherein the total amount of surface active agent comprised in the cathode mixture ranges from about 0.1 to 1.0 percent by weight.

11. The electrochemical cell of claim 10 wherein the solid electrolyte comprises:
a solid polymeric material;
an inorganic ion salt; and
one or more aprotic organic electrolytic solvents.

12. The electrochemical cell of either claim 5 or 6 wherein the solid electrolyte comprises an aprotic electrolytic organic solvent.

13. The electrochemical cell of claim 12 wherein the vanadium oxide comprises $V_6O_{13}$.

14. The electrochemical cell of either claim 5 or 6 wherein the vanadium oxide selected from the group consisting of $VO_2$, $V_2O_5$, $V_3O_7$, $V_3O_8$, $V_4O_9$ and $V_6O_{13}$.

15. A cathode suitable for use in a solid electrochemical cell which is produced by the process comprising the steps of:
(i) providing a cathode paste which comprises:

from about 35 to 65 weight percent of a vanadium oxide cathodic material;

from about 1 to 20 weight percent of an electroconductive agent;

from about 0 to 20 weight percent of a polyethylene oxide having a number average molecular weight of at least 100,000;

from about 10 to 50 weight percent of an aprotic organic solvent;

from about 0.1 to about 1.0 weight percent of one or more surface active agents, wherein said surface active agents are selected from the group consisting of an ammonium or alkali metal salt of a perfluorocarbyl sulfate or sulfonate, sorbitan monooleate, octylphenoxypolyethoxyethanol, and alkyloxypolyethyleneoxypolypropyleneoxy ethanol; and from about 5 to 30 weight percent of a solid matrix forming monomer or partial polymer thereof; wherein all weight percents are based on the total weight of the cathode paste, and (ii) curing the solid matrix forming monomer or partial polymer.

16. A cathode suitable for use in a solid electrochemical cell which is produced by the process comprising the steps of:

(i) providing a cathode paste which comprises:

from about 35 to 65 weight percent of a vanadium oxide cathodic material;

from about 1 to 20 weight percent of an electroconductive agent;

from about 0 to 20 weight percent of a polyethylene oxide having a number average molecular weight of at least 100,000;

from about 10 to 50 weight percent of an aprotic organic solvent;

from about 0.1 to about 1.0 weight percent of one or more surface active agents;

wherein said surface active agents are selected from the group consisting of $R_fSO_3NH_4$, $R_fSO_2N(C_2H_5)CH_2CO_2K$, $R_fSO_2NHC_3H_6N(CH_3)_3I$, $R_fSO_2N(C_2H_5)CH_2CH_2O)_xH$, $R_fSO_2N(C_2H_5)(CH_2CH_2O)_xCH_3$, fluoroaliphatic polymeric ester, ammonium perfluoroalkyl sulfonate, perfluoroalkyl sulfonate amine, and mixtures thereof, wherein $R_f$ is $C_nF_{2n+1}$, and n is about 8, sorbitan monooleate, octylphenoxypolyethoxyethanol, and alkyloxypolyethyleneoxypolypropyleneoxy ethanols; and from about 5 to 30 weight percent of a solid matrix forming monomer or partial polymer thereof;

wherein all weight percents are based on the total weight of the cathode paste, and (ii) curing the solid matrix forming monomer or partial polymer.

17. The solid cathode of either claim 15 or 16 wherein the cathode paste is placed onto a current collector.

18. The solid cathode of either claim 15 or 16 wherein the cathode has a thickness of about 20 to about 150 $\mu$.

19. A cathode paste which comprises:

from about 35 to 65 weight percent of a vanadium oxide cathodic material;

from about 1 to 20 weight percent of an electroconductive agent;

from about 0 to 20 weight percent of a polyethylene oxide having a number average molecular weight of at least 100,000;

from about 10 to 50 weight percent of an aprotic organic solvent; and from about 0.1 to about 1.0 weight percent of one or more surface active agents;

wherein all weight percents are based on the total weight of the cathode paste, and wherein said surface active agents are selected from the group consisting of an ammonium or alkali metal salt of a perfluorocarbyl sulfate or sulfonate, sorbitan monooleate, and alkyloxypolyethyleneoxypolypropyleneoxy ethanol.

20. A cathode paste which comprises:

from about 35 to 65 weight percent of a vanadium oxide cathodic material;

from about 1 to 20 weight percent of an electroconductive agent;

from about 0 to 20 weight percent of a polyethylene oxide having a number average molecular weight of at least 100,000;

from about 10 to 50 weight percent of an aprotic organic solvent; and from about 0.1 to about 1.0 weight percent of one or more surface active agents;

wherein all weight percents are based on the total weight of the cathode paste, and wherein said surface active agents are selected from the group consisting of $R_fSO_3NH_4$, $R_fSO_2N(C_2H_5)CH_2CO_2K$, $R_fSO_2NHC_3H_6N(CH_3)_3I$, $R_fSO_2N(C_2H_5)CH_2CH_2O)_xH$, $R_fSO_2N(C_2H_5)(CH_2CH_2O)_xCH_3$, fluoroaliphatic polymeric ester, ammonium perfluoroalkyl sulfonate, perfluoroalkyl sulfonate amine, and mixtures thereof, wherein $R_f$ is $C_nF_{2n+1}$, and n is alkyloxypolyethyleneoxypolypropyleneoxy ethanol.

* * * * *